United States Patent
Lim et al.

(10) Patent No.: US 10,321,477 B2
(45) Date of Patent: Jun. 11, 2019

(54) METHOD AND APPARATUS FOR REQUESTING UPLINK PERSISTENT SCHEDULING IN MOBILE COMMUNICATION SYSTEM

(71) Applicant: Electronics and Telecommunications Research Institute, Daejeon (KR)

(72) Inventors: Kwang Jae Lim, Daejeon (KR); Yu Ro Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 178 days.

(21) Appl. No.: 15/257,271

(22) Filed: Sep. 6, 2016

(65) Prior Publication Data

US 2017/0071010 A1    Mar. 9, 2017

(30) Foreign Application Priority Data

Sep. 7, 2015   (KR) .................. 10-2015-0126556
Aug. 11, 2016  (KR) .................. 10-2016-0102566

(51) Int. Cl.
*H04W 72/04*    (2009.01)
*H04W 72/12*    (2009.01)

(52) U.S. Cl.
CPC ..... *H04W 72/1284* (2013.01); *H04W 72/042* (2013.01); *H04W 72/0413* (2013.01); *H04W 72/1252* (2013.01); *H04W 72/1268* (2013.01); *H04W 72/1289* (2013.01)

(58) Field of Classification Search
CPC ......... H04W 72/1268; H04W 72/1284; H04W 72/04; H04W 72/0413; H04W 72/042; H04W 74/0833
See application file for complete search history.

(56) References Cited

U.S. PATENT DOCUMENTS

| | | | |
|---|---|---|---|
| 8,644,228 B2 | 2/2014 | Kim et al. | |
| 2010/0077100 A1* | 3/2010 | Hsu | H04W 72/1221 709/234 |
| 2011/0141983 A1* | 6/2011 | Hong | H04W 28/0278 370/329 |
| 2012/0039204 A1* | 2/2012 | Gao | H04W 72/0486 370/252 |
| 2012/0093121 A1 | 4/2012 | Zhang | |
| 2014/0023008 A1 | 1/2014 | Ahn et al. | |
| 2014/0198699 A1 | 7/2014 | Makharia et al. | |

(Continued)

OTHER PUBLICATIONS

"Technical Specification Group Radio Access Network; Evolved Universal Terrestrial Radio Access (E-UTRA); Medium Access Control (MAC) protocol specification," 3rd Generation Partnership Project, Mar. 2015, pp. 1-77, V12.5.0.

*Primary Examiner* — Timothy J Weidner
(74) *Attorney, Agent, or Firm* — William Park & Associates Ltd.

(57) ABSTRACT

Provided are a method and an apparatus for requesting uplink persistent scheduling in a mobile communication system. A terminal generates a semi-persistent scheduling (SPS) buffer status report (BSR) including a size of data and further including at least one of an SPS transmission point in time and an SPS period after configuring SPS between the terminal and a base station, and requests SPS allocation while transmitting the SPS BSR to the base station. The size of the data indicates a size of data that are to be transmitted per SPS period.

17 Claims, 8 Drawing Sheets

(56) References Cited

U.S. PATENT DOCUMENTS

2015/0289268 A1* 10/2015 Ohta ................ H04W 4/04
                                                    370/336
2017/0019887 A1*  1/2017 Jiang ............... H04W 72/042
2017/0295567 A1* 10/2017 Chen ............... H04W 72/0406

* cited by examiner

METHOD AND APPARATUS FOR REQUESTING UPLINK PERSISTENT SCHEDULING IN MOBILE COMMUNICATION SYSTEM

CROSS-REFERENCE TO RELATED APPLICATION

This application claims priority to and the benefit of Korean Patent Application Nos. 10-2015-0126556 and 10-2016-0102566 filed in the Korean Intellectual Property Office on Sep. 7, 2015 and Aug. 11, 2016, the entire contents of which are incorporated herein by reference.

BACKGROUND OF THE INVENTION (a) Field of the Invention

The present invention relates to a method and an apparatus for requesting uplink persistent scheduling in a mobile communication system.

(b) Description of the Related Art

An existing mobile communication system, for example, a long term evolution (LTE) mobile communication system provides semi-persistent scheduling (SPS) for periodic uplink resource scheduling without increasing an overhead due to transmission of a control channel per packet transmission, for the purpose of a periodic real-time service such as Voice over Internet Protocol (VoIP) in an uplink. An uplink SPS configuration is performed by a radio resource control (RRC) reconfiguration process, and an SPS period is set in this process. An uplink SPS allocation request is performed by transmitting a buffer status report (BSR) sub-header through a scheduling request (SR) physical uplink control channel (PUCCH) or random access (RA) process, and a BSR includes a size of data that are waiting in a buffer of a terminal. SPS activation or allocation is performed by a physical downlink control channel (PDCCH), and SPS allocation information includes a SPS resource size, a modulation coding scheme (MCS), and the like.

However, in a real-time service sensitive to a delay among current and future mobile communication services, a period at which traffics are generated may be changed depending on a time, and a size of traffic data generated per period may also be changed. In an existing LTE SPS scheme, the RRC reconfiguration process should be again performed in order to change an SPS transmission period. In addition, for the purpose of low delay transmission, data should be allocated in a state in which a data packet arrival point in time and an SPS transmission point in time are as possible as close to each other. However, in the existing LTE SPS scheme, a means informing a base station of a time difference between the data packet arrival point in time and the SPS transmission point in time at the terminal is not present. In addition, an existing BSR, which indicates a size of entire data that are currently waiting in the buffer of the terminal, does not mean a size of data that are to be transmitted per SPS transmission period.

Therefore, a method for low delay and efficient semi-persistent scheduling (SPS) in an uplink has been demanded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for requesting uplink persistent scheduling in a mobile communication system having advantages of low delay and efficient semi-persistent scheduling (SPS) in an uplink of a mobile communication system.

An exemplary embodiment of the present invention provides a method for requesting uplink persistent scheduling, including: a terminal generating a semi-persistent scheduling (SPS) buffer status report (BSR) including a size of data and further including at least one of an SPS transmission point in time and an SPS period after configuring SPS between the terminal and a base station; and the terminal requesting SPS allocation while transmitting the SPS BSR to the base station, wherein the size of the data indicates a size of data that are to be transmitted per SPS period.

In the requesting, the terminal may transmit the SPS BSR using a medium access control (MAC) packet data unit (PDU), and a sub-header of the MAC PDU may include a logical channel ID (LCID) set in a predetermined sequence in order to inform that the MAC PDU includes an SPS BSR MAC control element as a payload.

The SPS BSR MAC control element may include a logical channel group (LCG) ID, a start field including information corresponding to the SPS transmission point in time, a period field including a sub-frame unit corresponding to the SPS period, and a size field including an SPS data size.

Alternatively, the SPS BSR MAC control element may include a start field including information corresponding to the SPS transmission point in time, a period field including a sub-frame unit corresponding to the SPS period, a size field including an SPS data size, and an LCID corresponding to an ID of a logical channel that is to be transmitted through the SPS allocation.

The start field may include information related to a sub-frame number corresponding to a transmission point in time demanded as the SPS transmission point in time, and the information may include a lower least significant bit (LSB) when the sub-frame number is represented by a bit string. In the case in which the terminal requests the SPS period P, the SPS transmission point in time T, and the SPS data size S through the SPS BSR, the sub-frame number may satisfy Equation: "Subframe number LSB=(T modulo P)+nP (n=0, 1, 2, . . . )".

The method for requesting uplink persistent scheduling may further include, before the generating, receiving a radio resource control (RRC) reconfiguration message including a plurality of SPS periods that are usable, depending on the SPS configuration from the base station; transmitting an RRC reconfiguration complete message in response to the RRC reconfiguration message; and transmitting an uplink SPS request to the base station in order to transmit data by the SPS in an uplink. The SPS period included in the SPS BSR may be one of the plurality of SPS periods included in the RRC reconfiguration message.

The method for requesting uplink persistent scheduling may further include, after the requesting, receiving SPS activation information depending on the SPS allocation based on the SPS BSR from the base station; and the terminal performing SPS transmission depending on the SPS activation information, wherein the SPS activation information includes an SPS period, and the SPS period is set on the basis of the SPS period included in the SPS BSR transmitted by the terminal.

In the case in which the SPS transmission point in time included in the SPS BSR transmitted by the terminal is a sub-frame T, the SPS activation information may be transmitted in a sub-frame $T-N_{proc}$ so that resource allocation depending on the SPS is made in the sub-frame T depending on the SPS transmission point in time.

The method for requesting uplink persistent scheduling may further include, after the performing of the SPS transmission, the terminal transmitting a new SPS BSR to request a change of a size of allocated resources or the SPS period.

Another exemplary embodiment of the present invention provides an apparatus for requesting uplink persistent scheduling in a terminal, including: a transceiver transmitting and receiving signals through an antenna; and a processor connected to the transceiver and performing uplink persistent scheduling request processing, wherein the processor includes: an SPS request processor configured to transmit an uplink SPS request to a base station after configuring SPS; and a BSR report processor configured to generate an SPS BSR including a size of data that are to be transmitted per SPS period and further including at least one of an SPS transmission point in time and an SPS period and request SPS allocation while transmitting the SPS BSR to the base station.

The BSR report processor may be configured to select one of a plurality of SPS periods that are included in a reconfiguration message received from the base station and are usable to generate the SPS BSR.

The processor may further include: an SPS reception processor configured to receive SPS activation information depending on the SPS allocation based on the SPS BSR from the base station; and a transmission processor configured to allow the terminal to perform SPS transmission depending on the SPS activation information, and the transmission processor may be configured to transmit data depending on an SPS period included in the SPS activation information.

The BSR report processor may transmit the SPS BSR using a medium access control (MAC) packet data unit (PDU), and a sub-header of the MAC PDU may include a logical channel ID (LCID) set in a predetermined sequence in order to inform that the MAC PDU includes an SPS BSR MAC control element as a payload.

The SPS BSR MAC control element may include a logical channel group (LCG) ID, a start field including information related to a sub-frame number corresponding to a transmission point in time demanded as the SPS transmission point in time, a period field including a sub-frame unit corresponding to the SPS period, and a size field including an SPS data size.

Alternatively, the SPS BSR MAC control element may include a start field including information related to a sub-frame number corresponding to a transmission point in time demanded as the SPS transmission point in time, a period field including a sub-frame unit corresponding to the SPS period, a size field including an SPS data size, and an LCID corresponding to an ID of a logical channel that is to be transmitted through the SPS allocation.

Yet another exemplary embodiment the present invention provides a base station for processing an uplink persistent scheduling request of a terminal, including: a transceiver transmitting and receiving signals through an antenna; and a processor connected to the transceiver and performing processing on the uplink persistent scheduling request, wherein the processor includes: an SPS configuration processor configured to perform an RRC reconfiguration process between the base station and the terminal to configure SPS and transmit an RRC reconfiguration message including a plurality of SPS periods that are usable to the terminal through the transceiver; an SPS allocation processor configured to receive an SPS BSR transmitted from the terminal through the transceiver and perform SPS allocation processing on the basis of the SPS BSR; and an information transmission processor configured to transmit SPS activation information depending on the SPS allocation processing of the SPS allocation processor to the terminal through the transceiver, and the SPS activation information includes an SPS period.

The SPS BSR may include a size of data that are to be transmitted per SPS period, an SPS transmission point in time, and an SPS period, and the SPS allocation processor may obtain the SPS BSR from an SPS BSR MAC control element transmitted through an MAC PDU, and recognize that a payload of the MAC PDU includes the SPS BSR MAC control element on the basis of an LCID included in a sub-header of the MAC PDU.

The information transmission processor may transmit the SPS activation information in a sub-frame $T-N_{proc}$ so that resource allocation depending on the SPS is made in a sub-frame T depending on the SPS transmission point in time, in the case in which the SPS transmission point in time included in the SPS BSR received from the terminal is the sub-frame T.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, the word "comprise" and variations such as "comprises" or "comprising", will be understood to imply the inclusion of stated elements but not the exclusion of any other elements.

Throughout the present specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like, and may include all or some of functions of the MT, the MS, the AMS, the HR-MS, the SS, the PSS, the AT, the UE, or the like.

In addition, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [femto base station (femto BS), a home node B (HNB), a home eNodeB (HeNB), a pico base station (pico BS), a metro base station (metro BS), a micro base station (micro BS), and the like], or the like, and may include all or some of functions of the ABS, the node B, the eNodeB, the AP, the RAS, the BTS, the MMR-BS, the RS, the RN, the ARS, the HR-RS, the small base stations, or the like.

Hereinafter, a method and an apparatus for requesting uplink persistent scheduling in a mobile communication system according to an exemplary embodiment of the present invention will be described with reference to the accompanying drawings.

Figure 1:
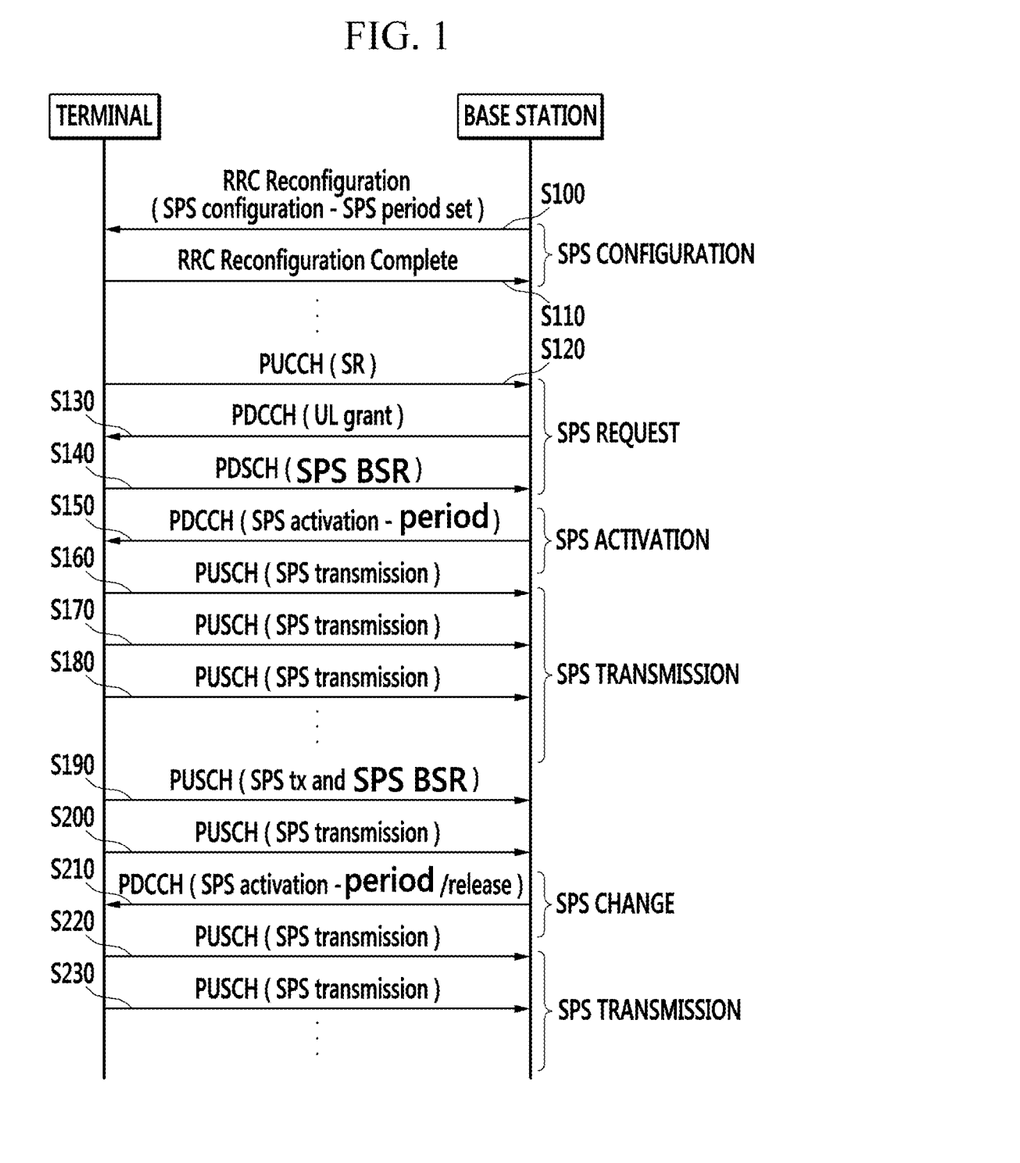
FIG. 1 is a view showing a semi-persistent scheduling (SPS) processing process in a mobile communication system according to an exemplary embodiment of the present invention.

FIG. 1 is a view showing a semi-persistent scheduling (SPS) processing process in a mobile communication system according to an exemplary embodiment of the present invention. In detail, FIG. 1 shows uplink SPS configuration, SPS activation, SPS transmission, and reallocation processes according to an exemplary embodiment of the present invention in the mobile communication system. The reallocation may also be called SPS changing.

In order to allocate SPS to any terminal, a radio resource control (RRC) reconfiguration process between a base station and the terminal is first performed to perform a process of configuring the SPS (SPS configuration). The base station transmits an RRC reconfiguration message including an SPS period, an SPS cell-radio network temporary identifier (C-RNTI), a main SPS parameter, and the like, to the terminal (S100). In an exemplary embodiment of the present invention, a plurality of SPS periods that are usable are included and transmitted in the RRC reconfiguration message. The terminal transmits an RRC reconfiguration complete message in response to the RRC reconfiguration message to complete the SPS configuration (S110).

In the related art, one SPS period for a corresponding terminal is determined and transmitted. On the other hand, as shown in FIG. 1, an SPS period set including the plurality of SPS periods that are usable is included and transmitted in the reconfiguration message, and the plurality of SPS periods that are usable for any terminal are provided through the SPS configuration process.

After the configuration of the SPS is completed, the terminal performs a process for requesting uplink SPS (SPS request) for the purpose of data transmission by the SPS in an uplink. In the case in which a physical uplink control channel (PUCCH) allocated to the terminal for a scheduling request (SR) is present, the terminal transmits the SR through the corresponding PUCCH (S120), and the base station allocates uplink resources in which the terminal transmits a buffer state report (BSR) through a physical downlink control channel (PDCCH) (uplink (UL) grant transmission) (S130). The terminal transmits the BSR in the allocated uplink resources through a physical uplink shared channel (PUSCH) (S140). Here, the terminal transmits an SPS BSR for requesting uplink SPS allocation.

The SPS BSR according to an exemplary embodiment of the present invention includes an SPS transmission point in time, an SPS period, and a size of data (hereinafter, referred to as an SPS data size) requested per period. In the related art, the terminal transmits a BSR including only information on a size of entire data that are waiting for uplink transmission. In the related art, a size of data that are transmitted does not mean a size of data that are to be transmitted per SPS period. However, in an exemplary embodiment of the present invention, the BSR including the SPS transmission point in time, the SPS period, and the SPS data size, that is, the SPS BSR is transmitted. The size of the data that are to be transmitted per SPS period rather than the size of the entire data that are currently waiting in a buffer of the terminal is provided, such that the base station may more efficiently perform SPS allocation. Here, the SPS period may be one period selected among a plurality of SPS periods that the terminal receives from the basis station in an SPS configuration process and are usable. Meanwhile, in the case in which the PUCCH allocated to the terminal for the SR is not present, resources for transmitting the BSR are allocated through a random access (RA) process. In an exemplary embodiment of the present invention, forms in which signals are transmitted and received through channels such as the PUCCH, PDCCH, and the like, will also be called forms in which 'the channels such as the PUCCH, PDCCH, and the like, are transmitted and received'.

After the base station receives the SPS BSR from the terminal, the base station performs the SPS on the basis of the SPS BSR, and transmits SPS activation information depending on the performing of the SPS through the PDCCH to inform the terminal of radio resource allocation depending on the SPS (S150).

In an exemplary embodiment of the present invention, in the case in which the SPS transmission point in time included in the SPS BSR transmitted by the terminal is requested in a sub-frame T, the base station transmits the PDCCH for SPS activation in a sub-frame T-$N_{proc}$ to allow the resource allocation depending on the SPS to be performed in the su T depending on the SPS transmission point in time requested by the terminal. $N_{proc}$, which is an interval between a PDCCH reception sub-frame and a sub-frame to which the uplink resource allocation included in the PDCCH is applied as in an existing system, becomes 4 in the case of an FDD system. In addition, for the purpose of SPS allocation depending on the SPS period and the SPS data size included in the SPS BSR transmitted by the terminal, information (hereinafter, referred to as SPS allocation information) related to radio resource allocation depending on the SPS transmitted through the PDCCH includes an SPS resource position, a transport block (TB) size, and a modulation and coding scheme (MCS), and particularly, further includes an SPS period. The SPS period for the terminal is determined in the SPS configuration process in the related art, but is included in the SPS activation information transmitted for SPS activation and is transmitted through the PDCCH in an exemplary embodiment of the present invention.

The terminal receives the PDCCH including the SPS allocation information, and periodically transmits packets through the PUSCH in the allocated SPS resources on the basis of the PDCCH including the SPS allocation information (S160 to S180). The SPS transmission indicates that the terminal periodically transmits the packets in the uplink depending on the allocated SPS resources.

In the related art, when it is assumed that the SPS period is determined in the SPS configuration process on the basis of the RRC reconfiguration and the PDCCH including the SPS activation information is received in the sub-frame n-$N_{proc}$, a start point of the SPS transmission in the uplink of an existing LTE based system becomes an uplink sub-frame n. In this case, the terminal periodically transmits data through the PUSCH from the uplink sub-frame n (the start point of the SPS transmission) in uplink sub-frames n, n+P, n+2P, . . . depending on the SPS period P determined in the SPS configuration process.

On the other hand, in an exemplary embodiment of the present invention, the PDCCH including the SPS activation information is received in the sub-frame T-$N_{proc}$, and the terminal performs the SPS transmission in the sub-frame T, which is the SPS transmission point in time requested by the terminal. The terminal periodically transmits data through the PUSCH from the uplink sub-frame T (the start point of the SPS transmission) in uplink sub-frames T, T+P, T+2P, . . . depending on the SPS period P received in the SPS activation process.

For the purpose of low delay transmission, data should be allocated in a state in which a data packet arrival point in time in which data packets for uplink transmission arrive at the buffer of the terminal and the SPS transmission point in time in which packets are transmitted on the basis of the SPS resources are as possible as close to each other. However, in the related art, the terminal may not inform the base station of a time difference between the data packet arrival point in time and the SPS transmission point in time. However, according to an exemplary embodiment of the present invention, the terminal transmits the SPS BSR including the SPS transmission point in time set by the terminal to the base station, the base station performs the SPS activation on the basis on the SPS transmission point in time requested by the terminal, and the terminals transmits the data packets in the corresponding SPS transmission point in time. Therefore, a different is not substantially generated between the data packet arrival point in time and the SPS transmission point in time, such that low delay transmission is made.

Meanwhile, the terminal may transmit the SPS BSR to the base station in order to request a change of the allocated resource size (S190). The base station may allocate new SPS for substituting for the existing SPS allocation through the PDCCH in order to change the SPS resource size depending on the SPS BSR. In this case, the base station transmits SPS release control information in order to release the existing SPS allocation and transmits the SPS activation information for the purpose of new SPS allocation, through the PDCCH, and the SPS activation information includes the SPS period (SPS activation/release) (S200 and S210). In the case in which a transmission point in time of the new SPS allocation is the same as the transmission point in time of the existing SPS, the base station transmits only the PDCCH including only the SPS activation information without releasing the SPS (SPS overriding).

In addition, the terminal may transmit the SPS BSR including a new SPS period to the base station as described above in order to request a change of the SPS period. Therefore, the base station may perform new SPS allocation. Accordingly, the base station may transmit the SPS activation information including the changed SPS period to the terminal through the PDCCH. In the related art, the RRC reconfiguration process should be again performed in order to change the SPS period in an uplink scheme. However, in an exemplary embodiment of the present invention, the SPS period may be more easily changed through the transmission of the SPS BSR.

Then, the terminal periodically transmits data through the PUSCH depending on the SPS resource having the changed size or the changed SPS period (S220 and S230).

As described above, in an exemplary embodiment of the present invention, the terminal transfers the SPS transmission point in time, the SPS period, and the SPS data size to the base station, and the base station performs the SPS allocation and reallocation, such that low delay and efficient SPS operations in the uplink are made.

Figure 2:
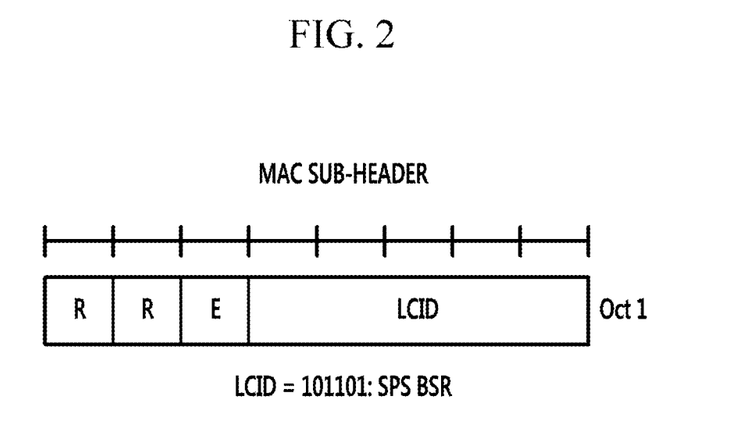
FIG. 2 is a view showing a structure of a sub-header according to an exemplary embodiment of the present invention.

FIG. 2 is a view showing a structure of a sub-header according to an exemplary embodiment of the present invention.

An SPS BSR message is one of medium access control (MAC) control elements (CEs) performed in an MAC layer, and is distinguished from other control elements in the MAC layer by a logical channel ID (LCID).

As shown in FIG. 2, in order to inform the transmission of the SPS BSR according to an exemplary embodiment of the present invention, an LCID of a sub-header (hereinafter, referred to as an MAC sub-header for convenience of explanation) included in a header of an MAC packet data unit (MAC PDU) includes a specific sequence. The LCID is set to a predetermined specific sequence in order to inform that a payload of the MAC PDU includes an SPS BSR MAC control element (CE). For example, as shown in FIG. 2, LCID is set to a specific sequence of 101101 to inform that the SPS BSR is transmitted through the corresponding PDU. In the MAC sub-header shown in FIG. 2, "R" is a reserved bit field, and "E" is an extension field. These fields are the same fields as those of the MAC sub-header of the existing LTE.

Figure 3:
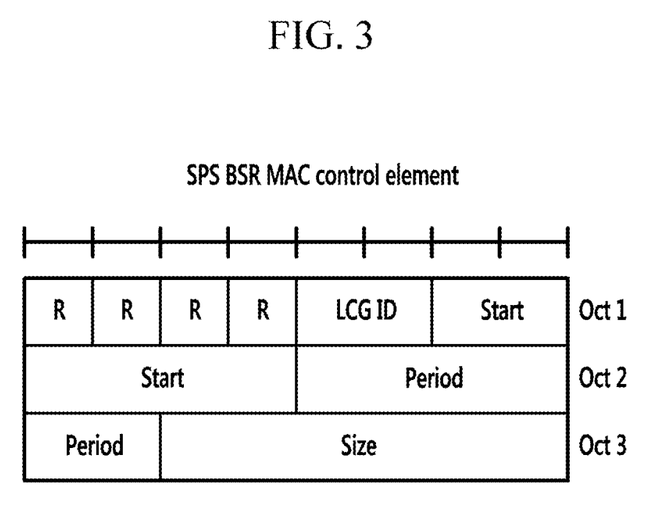
FIG. 3 is an illustrative view showing a configuration of an SPS buffer status report (BSR) medium access control (MAC) control element according to an exemplary embodiment of the present invention.

FIG. 3 is an illustrative view showing a configuration of an SPS buffer status report (BSR) medium access control (MAC) control element according to an exemplary embodiment of the present invention.

The SPS BSR MAC control element includes an LCG ID, a start field, a period field, and a size field, as shown in FIG. 3.

A buffer status report performed by the terminal is reported in a logical channel group (LCG) unit. An LCG may be determined by the base station in consideration of a quality of service (QoS) class of identifier (QCI) corresponding to QoS information of each radio bearer (RB), or the like, and an LCG ID indicates an LCG group to which a logical channel that is to be transmitted through the SPS allocation belongs.

The start field includes information related to a sub-frame number corresponding to a transmission point in time demanded as an SPS transmission point in time S. In detail, the start field includes a lower least significant bit (LSB) when the sub-frame number is represented by a bit string. For example, the start field includes lower six bits of a sub-frame number represented by the bit string.

The period field includes a sub-frame unit corresponding to the requested SPS period P. The size field includes a size of data that are to be transmitted per requested SPS period P, and may represent the size of the data in a byte unit.

Figure 4:
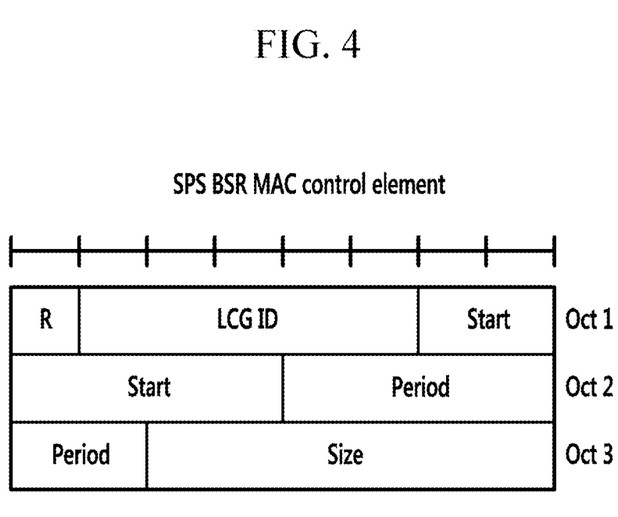
FIG. 4 is an illustrative view showing another configuration of an SPS BSR MAC control element according to an exemplary embodiment of the present invention.

FIG. 4 is an illustrative view showing another configuration of an SPS BSR MAC control element according to an exemplary embodiment of the present invention.

Unlike a configuration of FIG. 3, an SPS BSR MAC control element includes an LCID, a start field, a period field, and a size field, as shown in FIG. 4. That is, the SPS BSR MAC control element includes an ID (the LCID) of a logical channel that is to be transmitted through the SPS allocation, instead of the LCG ID.

In the case in which the terminal requests the SPS period P, the SPS transmission point in time T, and the SPS data size S through the SPS BSR, when the sub-frame number "Sub-frame number LSB=(T modulo P)+nP (n=0, 1, 2, . . . )", it indicates that the terminal requests periodic transmission of the SPS in a sub-frame of the corresponding number.

The SPS BSR MAC control elements configured in the structures as described above may be transmitted over bundled several sub-slots of uplink control information in sub-slot bundling.

An SPS processing process based on an uplink persistent scheduling request according to an exemplary embodiment of the present invention and an existing process will be compared with each other and described blow.

Figure 5:
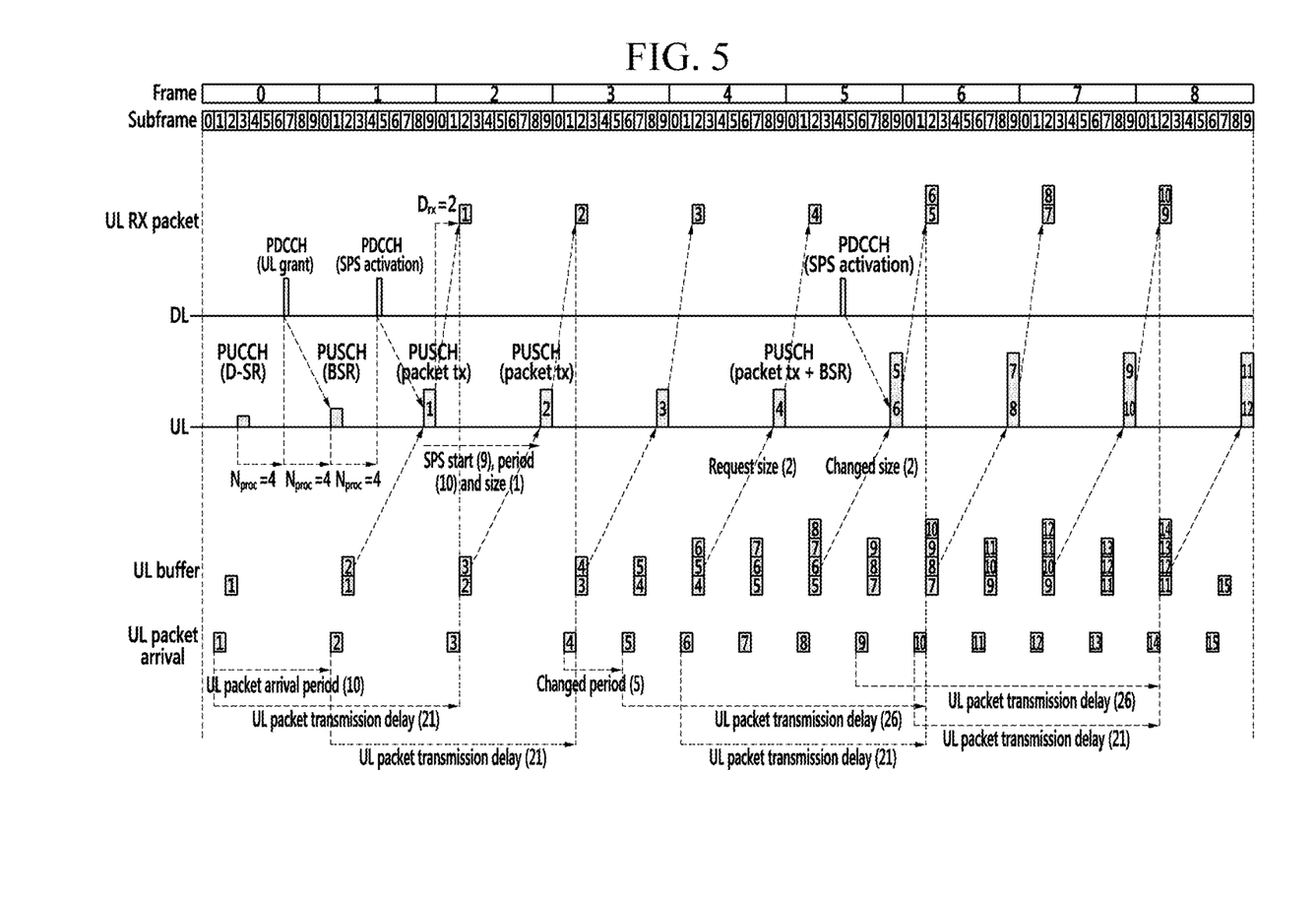
FIG. 5 is a view showing a process of transmitting uplink packets depending on an uplink SPS scheme of an existing LTE system.
Figure 6:
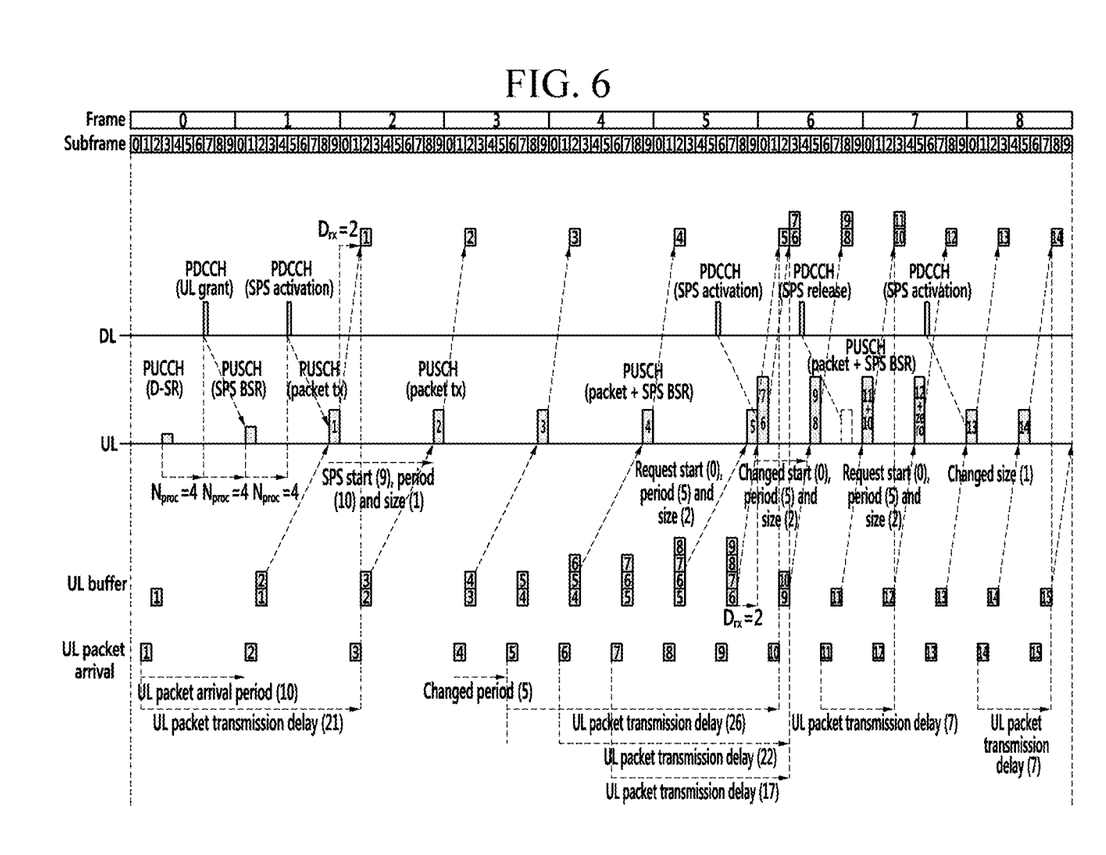
FIG. 6 is an illustrative view showing a process of transmitting uplink packets depending on an uplink SPS scheme according to an exemplary embodiment of the present invention.

FIG. 5 is a view showing a process of transmitting uplink packets depending on an uplink SPS scheme of an existing LTE system, and FIG. 6 is a view showing an illustrative process of transmitting uplink packets depending on an uplink SPS scheme according to an exemplary embodiment of the present invention.

In the existing LTE system, as shown in FIG. 5, uplink packets arrive in a time in which a sub-frame index of each frame is 1 per period P=10 (packet arrival period=10), and are buffered in the buffer of the terminal. When any resource is not allocated for the uplink, the terminal transmits a pre-allocated PUCCH to the base station in order to inform the base station of an SR. The base station allocates uplink resources for BSR transmission of the terminal through a PDCCH ($N_{proc}$=4 sub-frame in an example of FIG. 5) after receiving the PUCCH (SR) and processing scheduling. The terminal transmits the PUSCH including the BSR through the allocated uplink resources, and the base station informs the terminal of radio resource allocation through the PDCCH including the SPS activation information on the basis of the BSR. In this case, an SPS period is preset (period 10 sub-frame in FIG. 5) in the RRC reconfiguration process, and an SPS transmission point in time is a point in time after $N_{proc}$=4 sub-frame from a sub-frame in which the PDCCH including the SPS activation information is transmitted. The terminal periodically transmits packets through the PUSCH through the allocated SPS resources. In an example of FIG. 5, the SPS transmission is performed at a period of ten sub-frames in a sub-frame 9 of each frame. When it is assumed that $D_{rx}$=2 ($D_{rx}$ indicates a time required for receiving and decoding a packet) sub-frames are required for receiving the PUSCH and decoding the packet in the base station, a packet transmission delay corresponds to 21 sub-frames in FIG. 5. Since a length of the sub-frame is 1 ms in the LTE, a packet transmission delay time becomes 21 ms.

In FIG. 5, in the case in which a packet arrival period is changed from P=10 to P'=5 after a fifth packet, a size of data that are in an uplink buffer is increased, and the terminal allows the BSR together with the data packets to be included and transmitted in the PUSCH in order to inform that the size of the data that are in the uplink buffer is increased. In this case, the base station newly allocates the SPS in order to increase the SPS resource size. In FIG. 5, since the SPS is newly allocated in a point in time corresponding to the transmission point in time allocated previously, only the SPS activation information is transmitted without releasing the SPS. Although the SPS resource size is increased by two times through the SPS reallocation in order to transmit packets generated at a period decreased by two times, only the SPS resource size is increased without requiring a time depending on the reallocation process and changing the SPS transmission period. Therefore, a packet transmission delay time after the SPS reallocation is 21 sub-frames, which are the same as the previous packet transmission delay time, or is increased to 26 sub-frames.

Meanwhile, in the case of transmitting the uplink packets depending on the uplink SPS scheme according to an exemplary embodiment of the present invention, referring to FIG. 6, when a size of data that are in an uplink buffer is increased due to a change of a packet arrival period from P=10 to P'=5 after a fifth packet as in an example for the existing scheme shown in FIG. 5, the terminal requests a change of the SPS allocation through the SPS BSR. In the case in which it is assumed that a processing time for transmitting the packet in the buffer through the PUSCH is $D_{tx}$=2 ($D_{tx}$ indicates a time required for processing the packet in order to transmit the packet) sub-frames, the terminal may transmit the packet through the SPS PUSCH at a minimum standby time after the $D_{tx}$=2 sub-frames from a time in which the packet arrives at the buffer. In FIG. 6, since the packet arrives at the buffer in a sub-frame 2 and a sub-frame 7 of each frame, the terminal transmits the SPS BSR in an SPS transmission point in time (T'=(2+1+$D_{tx}$) modulo P'=4 or T'=(7+1+$D_{tx}$) modulo P'=0 (request T'=0 in FIG. 6)), at an SPS transmission period (P'=5 sub-frames), and at an SPS transmission size (S'=2 packets). The base station informs the terminal of the new SPS activation through the PDCCH, and informs the terminal that the existing SPS is released through the PDCCH, depending on the BSR transmitted from the terminal. When the terminal transmits the data packets through the PUSCH depending on the newly allocated SPS allocation, a packet transmission delay time with respect to packets in an SPS allocation change process is decreased to 22 sub-frames and 17 sub-frames as compared with the existing LTE scheme of FIG. 5. In addition, a packet transmission delay time with respect to packets arriving at the buffer after the SPS allocation change process is completed is significantly decreased to 7 sub-frames. The finally decreased packet transmission delay time becomes a minimum packet transmission delay time including only a processing time in transmission and reception processes.

Next, when the number of packets accumulated in the buffer is decreased by transmission of SPS transmission size (S=2) packets per sub-frame of the period (P=5), the terminal may transmit packets arriving at the buffer by transmission of an SPS transmission size (S=1) packet per sub-frame of the period (P=5). Therefore, the terminal requests reduction to the SPS transmission size S=1 through the SPS BSR. Since the base station reduces only the resource size without changing the transmission point in time and the period, the base station may change the existing SPS allocation resource size by only the SPS activation without transmitting the SPS release through the PDCCH.

Although an example of adjusting the SPS allocation by transmitting the SPS BSR during the SPS transmission has been shown in FIG. 6, the terminal requests packets of the SPS transmission point in time T=5, the SPS transmission period P=10, and the SPS transmission size S=1 from an initial SPS allocation process to adjust the SPS transmission point in time depending on a time in which the packets arrive at the buffer, thereby making it possible to minimize the transmission delay time.

Figure 7:
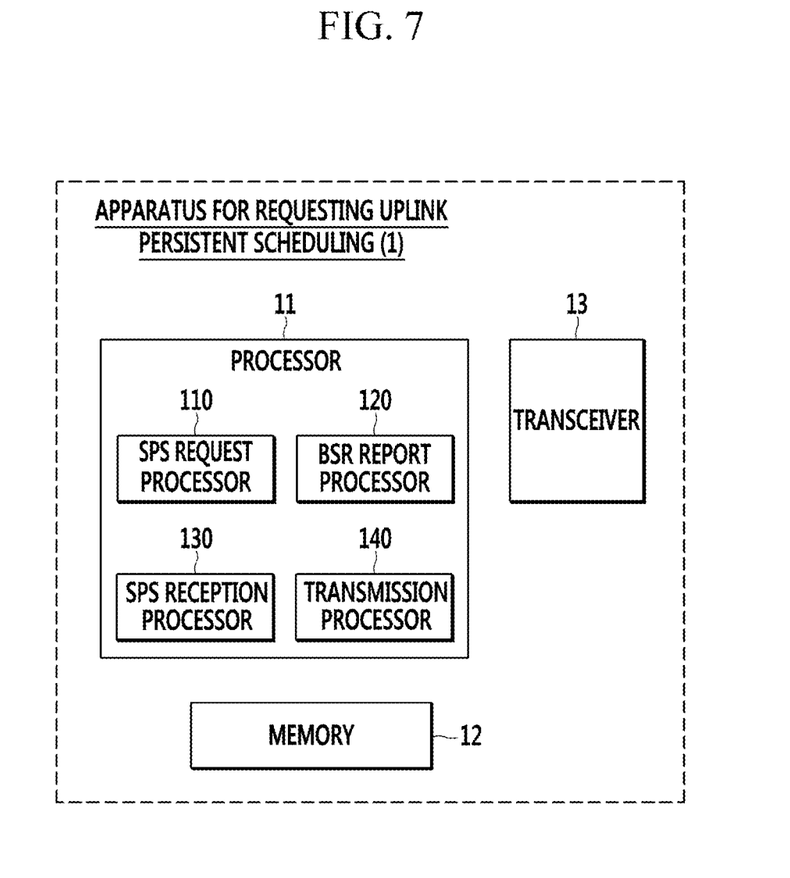
FIG. 7 is a block diagram showing an apparatus for requesting uplink persistent scheduling according to an exemplary embodiment of the present invention.

FIG. 7 is a block diagram showing an apparatus for requesting uplink persistent scheduling according to an exemplary embodiment of the present invention.

As shown in FIG. 7, the apparatus 1 for requesting uplink persistent scheduling according to an exemplary embodiment of the present invention includes a processor 11, a memory 12, and a transceiver 13. The processor 11 may be configured to implement the methods described with reference to FIGS. 1 to 4.

To this end, the processor 11 includes an SPS request processor 110, a BSR report processor 120, an SPS reception processor 130, and a transmission processor 140.

The SPS request processor 110 is configured to perform an uplink SPS request in order to transmit data by the SPS in the uplink after the SPS configuration is completed.

The BSR report processor 120 is configured to generate the SPS BSR including the SPS transmission point in time, the SPS period, and the SPS data size, and transmits the SPS BSR to the base station through the transceiver 13. The BSR report processor 120 allows the SPS BSR to be included and transmitted in the MAC sub-header, and may transmit the SPS BSR through the uplink resources allocated depending on a request of the SPS request processor 110.

The SPS reception processor 130 is configured to receive the SPS activation information depending on the SPS based on the SPS BSR from the base station. The SPS activation information includes the SPS allocation information, and the SPS allocation information includes the SPS resource position, the TB size, the MCS, the SPS period, and the like.

The transmission processor 140 is configured to periodically perform transmission of the data in the SPS resources allocated on the basis of the SPS allocation information.

The memory 12 is connected to the processor 11, and stores various kinds of information related to operations of the processor 11 therein. The memory 12 may store instructions that are to be executed in the processor 11 therein or load and temporally store instructions from a storage (not shown) therein. The processor 11 may execute the instructions stored or loaded in the memory 12. The processor 11 and the memory 12 are connected to each other through buses (not shown), and input and output interfaces (not shown) may also be connected to the buses.

Figure 8:
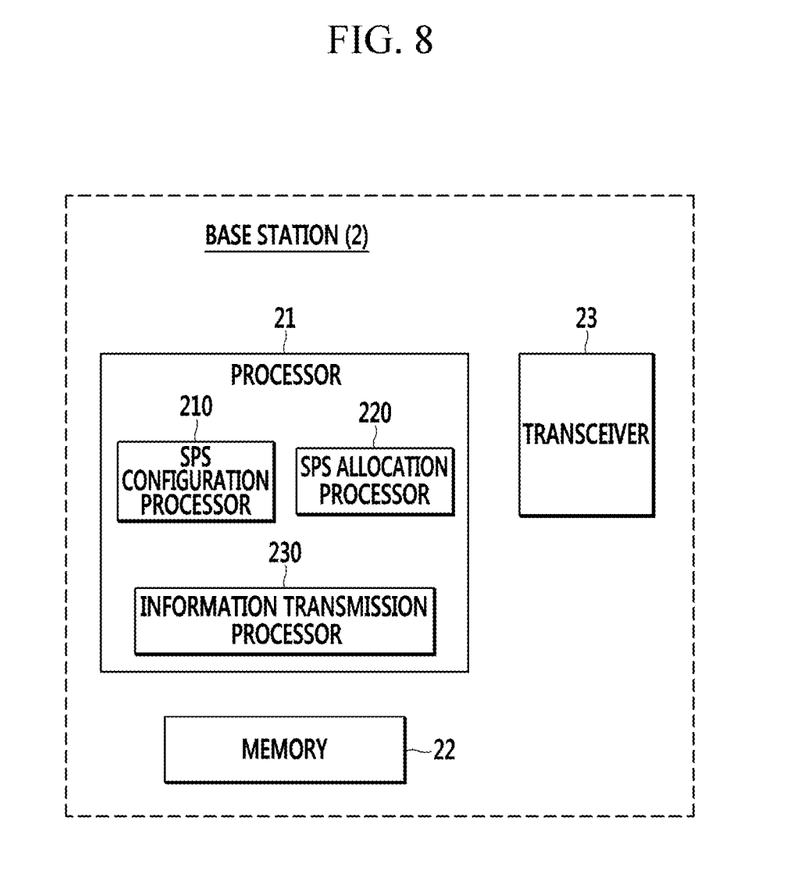
FIG. 8 is a block diagram showing a base station according to an exemplary embodiment of the present invention.

FIG. 8 is a block diagram showing a base station according to an exemplary embodiment of the present invention.

As shown in FIG. 8, the base station 2 according to an exemplary embodiment of the present invention includes a processor 21, a memory 22, and a transceiver 23.

The processor 21 may be configured to implement the methods described with reference to FIGS. 1 to 4.

To this end, the processor 21 includes an SPS configuration processor 210, an SPS allocation processor 220, and an information transmission processor 230.

The SPS configuration processor 210 is configured to perform the RRC reconfiguration process between the base station and the terminal to configure the SPS. The SPS configuration processor 210 transmits the RRC reconfiguration message including a plurality of SPS periods that are usable, an SPS C-RNTI, a main SPS parameter, and the like, to the terminal through the transceiver 23.

The SPS allocation processor 220 is configured to receive the SPS BSR from the terminal depending on the SPS allocation request from the terminal and perform the SPS allocation on the basis of the received the SPS BSR.

The information transmission processor 230 is configured to transmit the SPS activation information depending on the SPS allocation processing of the SPS allocation processor 220 to the terminal. The information transmission processor 230 transmits the SPS activation information including the SPS period and the information related to the radio resource allocation depending on the SPS allocation processing to the terminal through the transceiver 23.

The memory 22 is connected to the processor 21, and stores various kinds of information related to operations of the processor 21 therein. The memory 22 may store instructions that are to be executed in the processor 21 therein or load and temporally store instructions from a storage (not shown) therein. The processor 21 may execute the instructions stored or loaded in the memory 22. The processor 21 and the memory 22 are connected to each other through buses (not shown), and input and output interfaces (not shown) may also be connected to the buses.

According to an exemplary embodiment of the present invention, the terminal may request the persistent scheduling, that is, the SPS while transmitting the SPS transmission point in time, the SPS period, and the SPS data size to the base station for the purpose of efficient SPS. Therefore, a transmission delay time in a persistent scheduling scheme in the uplink of the mobile communication system may be decreased, variable real-time traffics may be more efficiently served.

The exemplary embodiments of the present invention described above are not implemented through only the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for requesting uplink persistent scheduling, comprising:
   a terminal generating a semi-persistent scheduling (SPS) buffer status report (BSR) including a size of data and further including at least one of an SPS transmission point in time and an SPS period after configuring SPS between the terminal and a base station;
   the terminal requesting SPS allocation while transmitting the SPS BSR to the base station;
   the terminal receiving SPS activation information depending on the SPS allocation based on the SPS BSR from the base station in a sub-frame that is based on a difference between the SPS transmission point and an preset interval; and
   the terminal performing SPS transmission depending on the SPS activation information,
   wherein the SPS activation information includes an SPS period, and the SPS period is set on the basis of the SPS period included in the SPS BSR transmitted by the terminal,
   when the SPS transmission point is a sub-frame T, the SPS activation information is transmitted in a sub-frame T-$N_{proc}$, and the $N_{proc}$ is the preset interval, and
   wherein the size of the data indicates a size of data that are to be transmitted per SPS period among data stored in a buffer.

2. The method for requesting uplink persistent scheduling of claim 1, wherein: in the requesting, the terminal transmits the SPS BSR using a medium access control (MAC) packet data unit (PDU), and a sub-header of the MAC PDU includes a logical channel ID (LCID) set in a predetermined sequence in order to inform that the MAC PDU includes an SPS BSR MAC control element as a payload.

3. The method for requesting uplink persistent scheduling of claim 2, wherein: the SPS BSR MAC control element includes a logical channel group (LCG) ID, a start field including information corresponding to the SPS transmission point in time, a period field including a sub-frame unit corresponding to the SPS period, and a size field including an SPS data size.

4. The method for requesting uplink persistent scheduling of claim 2, wherein: the SPS BSR MAC control element includes a start field including information corresponding to the SPS transmission point in time, a period field including a sub-frame unit corresponding to the SPS period, a size field including an SPS data size, and an LCID corresponding to an ID of a logical channel that is to be transmitted through the SPS allocation.

5. The method for requesting uplink persistent scheduling of claim 2, wherein: the start field includes information related to a sub-frame number corresponding to a transmission point in time demanded as the SPS transmission point in time, and the information includes a lower least significant bit (LSB) when the sub-frame number is represented by a bit string.

6. The method for requesting uplink persistent scheduling of claim 1, further comprising:
before the generating,
receiving a radio resource control (RRC) reconfiguration message including a plurality of SPS periods that are usable, depending on an SPS configuration from the base station;
transmitting an RRC reconfiguration complete message in response to the RRC reconfiguration message; and
transmitting an uplink SPS request to the base station in order to transmit data by the SPS in an uplink.

7. The method for requesting uplink persistent scheduling of claim 6, wherein: the SPS period included in the SPS BSR is one of the plurality of SPS periods included in the RRC reconfiguration message.

8. The method for requesting uplink persistent scheduling of claim 1, further comprising: after the performing of the SPS transmission, the terminal transmitting a new SPS BSR to request a change of a size of allocated resources or the SPS period.

9. A method for requesting uplink persistent scheduling, comprising:
a terminal generating a semi-persistent scheduling (SPS) buffer status report (BSR) including a size of data and further including at least one of an SPS transmission point in time and an SPS period after configuring SPS between the terminal and a base station; and
the terminal requesting SPS allocation while transmitting the SPS BSR to the base station,
wherein the size of the data indicates a size of data that are to be transmitted per SPS period,
in the requesting,
the terminal transmits the SPS BSR using a medium access control (MAC) packet data unit (PDU), and a sub-header of the MAC PDU includes a logical channel ID (LCID) set in a predetermined sequence in order to inform that the MAC PDU includes an SPS BSR MAC control element as a payload, and
the start field includes information related to a sub-frame number corresponding to a transmission point in time demanded as the SPS transmission point in time, and the information includes a lower least significant bit (LSB) when the sub-frame number is represented by a bit string, and wherein:
in the case in which the terminal requests the SPS period P, the SPS transmission point in time T, and the SPS data size S through the SPS BSR, the sub-frame number satisfies Equation: "Subframe number LSB=(T modulo P)+nP (n=0, 1, 2, . . . )".

10. A method for requesting uplink persistent scheduling, comprising:
a terminal generating a semi-persistent scheduling (SPS) buffer status report (BSR) including a size of data and further including at least one of an SPS transmission point in time and an SPS period after configuring SPS between the terminal and a base station;
the terminal requesting SPS allocation while transmitting the SPS BSR to the base station
receiving SPS activation information depending on the SPS allocation based on the SPS BSR from the base station; and
the terminal performing SPS transmission depending on the SPS activation information,
wherein: in the case in which the SPS transmission point in time included in the SPS BSR transmitted by the terminal is a sub-frame T, the SPS activation information is transmitted in a sub-frame $T-N_{proc}$ so that resource allocation depending on the SPS is made in the sub-frame T depending on the SPS transmission point in time.

11. An apparatus for requesting uplink persistent scheduling in a terminal, comprising:
a transceiver transmitting and receiving signals through an antenna; and
a processor connected to the transceiver and performing uplink persistent scheduling request processing,
wherein the processor includes:
a semi-persistent scheduling (SPS) request processor configured to transmit an uplink SPS request to a base station after configuring SPS; and
a buffer status report (BSR) report processor configured to generate an SPS BSR including a size of data that are to be transmitted per SPS period among data stored in a buffer and further including at least one of an SPS transmission point in time and an SPS period and request SPS allocation while transmitting the SPS BSR to the base station;
an SPS reception processor configured to receive SPS activation information depending on the SPS allocation based on the SPS BSR from the base station in a sub-frame that based on a difference between the SPS transmission point and an preset interval;
a transmission processor configured to allow the terminal to perform SPS transmission depending on the SPS activation information, and
the transmission processor is configured to transmit data depending on an SPS period included in the SPS activation information, and
wherein when the SPS transmission point is a sub-frame T, the SPS activation information is transmitted in a sub-frame $T-N_{proc}$, and the $N_{proc}$ is the preset interval.

12. The apparatus for requesting uplink persistent scheduling of claim 11, wherein: the BSR report processor is configured to select one of a plurality of SPS periods that are included in a reconfiguration message received from the base station and are usable to generate the SPS BSR.

13. The apparatus for requesting uplink persistent scheduling of claim 11, wherein: the BSR report processor transmits the SPS BSR using a medium access control (MAC) packet data unit (PDU), and a sub-header of the MAC PDU includes a logical channel ID (LCID) set in a predetermined sequence in order to inform that the MAC PDU includes an SPS BSR MAC control element as a payload.

14. The apparatus for requesting uplink persistent scheduling of claim 13, wherein: the SPS BSR MAC control element includes
  a logical channel group (LCG) ID, a start field including information related to a sub-frame number corresponding to a transmission point in time demanded as the SPS transmission point in time,
  a period field including a sub-frame unit corresponding to the SPS period, and
  a size field including an SPS data size.

15. The apparatus for requesting uplink persistent scheduling of claim 13, wherein: the SPS BSR MAC control element includes
  a start field including information related to a sub-frame number corresponding to a transmission point in time demanded as the SPS transmission point in time,
  a period field including a sub-frame unit corresponding to the SPS period,
  a size field including an SPS data size, and
  an LCID corresponding to an ID of a logical channel that is to be transmitted through the SPS allocation.

16. A base station for processing an uplink persistent scheduling request of a terminal, comprising:
  a transceiver transmitting and receiving signals through an antenna; and
  a processor connected to the transceiver and performing processing on the uplink persistent scheduling request,
  wherein the processor includes:
    a semi-persistent scheduling (SPS) configuration processor configured to perform a radio resource control (RRC) reconfiguration process between the base station and the terminal to configure SPS and transmit an RRC reconfiguration message including a plurality of SPS periods that are usable to the terminal through the transceiver;
    an SPS allocation processor configured to receive an SPS buffer status report (BSR) transmitted from the terminal through the transceiver and perform SPS allocation processing on the basis of the SPS BSR, the SPS BSR including an SPS transmission point in time; and
    an information transmission processor configured to transmit SPS activation information depending on the SPS allocation processing of the SPS allocation processor to the terminal through the transceiver in a sub-frame that is based on a difference between the SPS transmission point and an preset interval, and
  the SPS activation information includes an SPS period;
  the SPS BSR further includes a size of data that are to be transmitted per SPS period among data stored in a buffer of the terminal, an SPS transmission point in time, and an SPS period,
  the SPS allocation processor obtains the SPS BSR from an SPS BSR MAC control element transmitted through an MAC PDU, and recognizes that a payload of the MAC PDU includes the SPS BSR MAC control element on the basis of an LCID included in a sub-header of the MAC PDU, and
  wherein when the SPS transmission point is a sub-frame T, the SPS activation information is transmitted in a sub-frame T-$N_{proc}$ and the $N_{proc}$ is the preset interval.

17. A base station for processing an uplink persistent scheduling request of a terminal, comprising:
  a transceiver transmitting and receiving signals through an antenna; and
  a processor connected to the transceiver and performing processing on the uplink persistent scheduling request,
  wherein the processor includes:
    a semi-persistent scheduling (SPS) configuration processor configured to perform a radio resource control (RRC) reconfiguration process between the base station and the terminal to configure SPS and transmit an RRC reconfiguration message including a plurality of SPS periods that are usable to the terminal through the transceiver;
    an SPS allocation processor configured to receive an SPS buffer status report (BSR) transmitted from the terminal through the transceiver and perform SPS allocation processing on the basis of the SPS BSR, the SPS BSR including an SPS transmission point in time; and
    an information transmission processor configured to transmit SPS activation information depending on the SPS allocation processing of the SPS allocation processor to the terminal through the transceiver, and
  the SPS activation information includes an SPS period, and
  wherein: the information transmission processor transmits the SPS activation information in a sub-frame T-$N_{proc}$ so that resource allocation depending on the SPS is made in a sub-frame T depending on the SPS transmission point in time, in the case in which the SPS transmission point in time included in the SPS BSR received from the terminal is the sub-frame T.

* * * * *